Nov. 4, 1958 — L. N. LEA — 2,859,325
ELECTRICAL ICE CREAM DISPENSING GUN DEVICE
Filed April 1, 1957 — 2 Sheets-Sheet 1
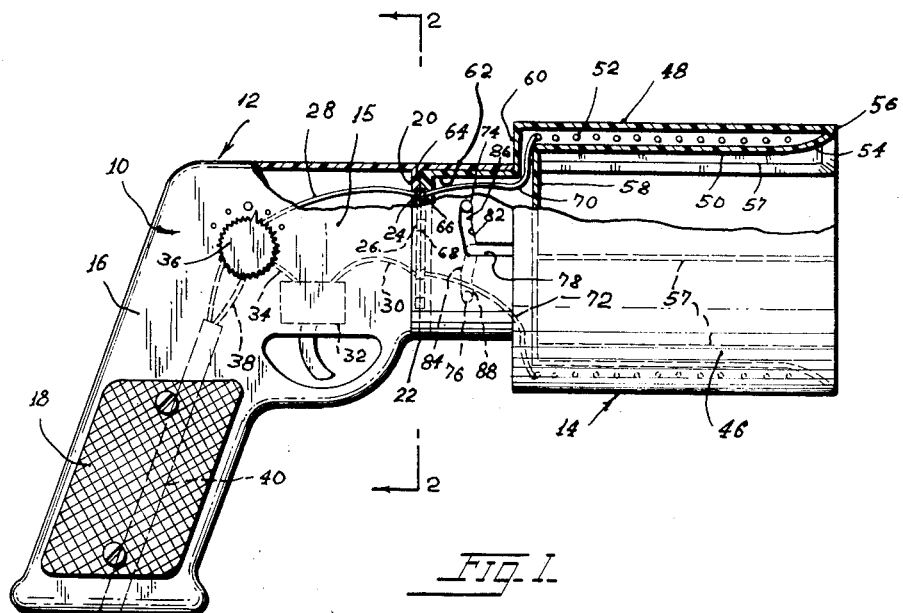
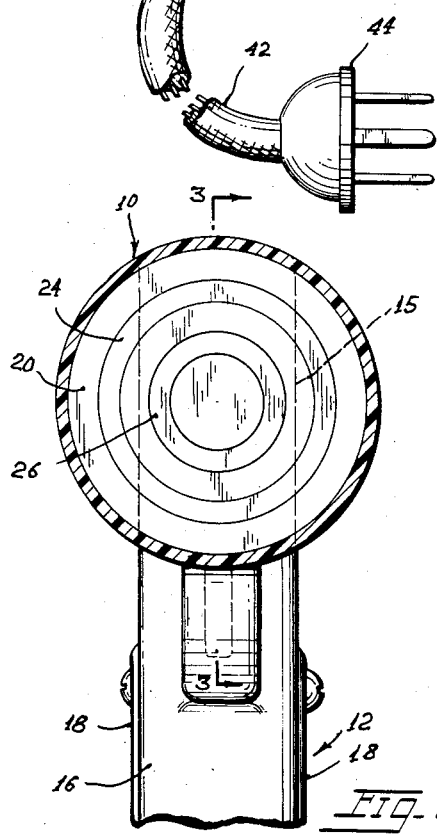
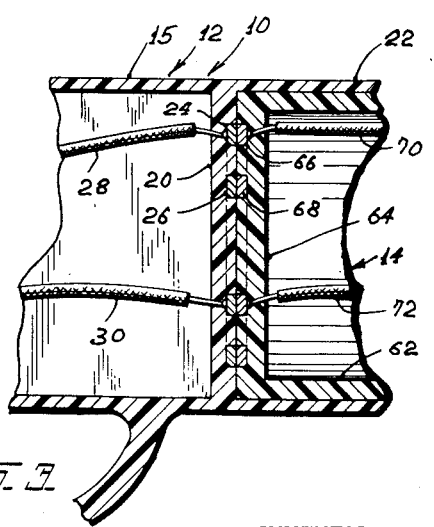
INVENTOR.
LAWRENCE N. LEA
BY
ATTORNEY Nov. 4, 1958 L. N. LEA 2,859,325
ELECTRICAL ICE CREAM DISPENSING GUN DEVICE
Filed April 1, 1957 2 Sheets-Sheet 2

INVENTOR.
LAWRENCE N. LEA
BY
ATTORNEY

United States Patent Office 2,859,325
Patented Nov. 4, 1958

2,859,325

ELECTRICAL ICE CREAM DISPENSING GUN DEVICE

Lawrence N. Lea, Bronx, N. Y.

Application April 1, 1957, Serial No. 649,774

2 Claims. (Cl. 219—21)

This invention relates to a dispenser or dipper for ice cream or other frozen foods. More particularly, the invention has reference to a device of this nature in which is incorporated a tubular receiver for the food, which receiver has in its wall an electrical heating element. On energizing of the element the receiver is capable of easily penetrating a frozen substance by reason of melting the substance where the same contacts the wall of the receiver. On full penetration of the substance by the receiver, the device is adapted, responsive to de-energization of the heating element, to cause the substance to adhere to the wall of the receiver for extraction therewith from the container in which said substance is normally confined. Subsequently, by energizing the heating element once again, the substance is adapted to gravitate from the receiver to be dispensed upon a plate or similar receptacle.

The main object of the invention is to provide an improved dipper or dispenser for ice cream or other frozen substances such as various frozen foods kept in the home, which dispenser will be designed to particularly facilitate the extraction of a selected quantity of food and the dispensing thereof upon a plate or the like.

Another object is to provide a device of the character stated so designed that any of a plurality of interchangeable receivers can be associated with the main or body portion of the device. In this way, it is proposed to permit any of various selected amounts of the frozen food to be dispensed.

Another object is to so form the receiver that it can be made in various cross-sectional shapes, including ornamental shapes that will produce, when the ice cream is dispensed upon the plate, a corresponding, attractive ornamental shape of ice cream. In this respect, the receiver is not only a dipper, but also an ornamental mold for the dispensed food.

Still another object is to form the device in a shape that will facilitate its handling, and its extension into and retraction from the substance that is being dispensed.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a side elevational view of the electrical dipper, parts being broken away.

Fig. 2 is an enlarged transverse sectional view on line 2—2 of Fig. 1.

Fig. 3 is a fragmentary longitudinal sectional view on the same scale as Fig. 2, taken on line 3—3 of Fig. 2.

Figure 4:
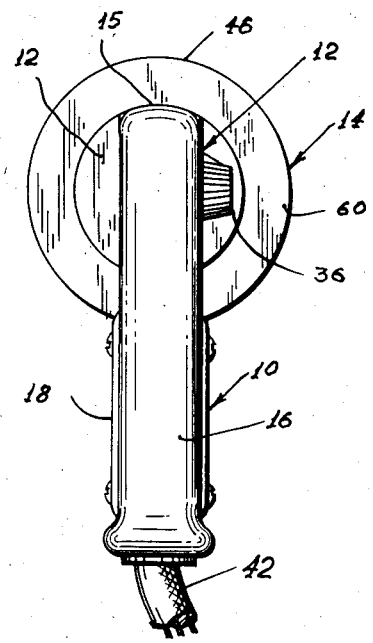
Fig. 4 is an end elevational view of the device as seen from the left of Fig. 1.
Figure 5:
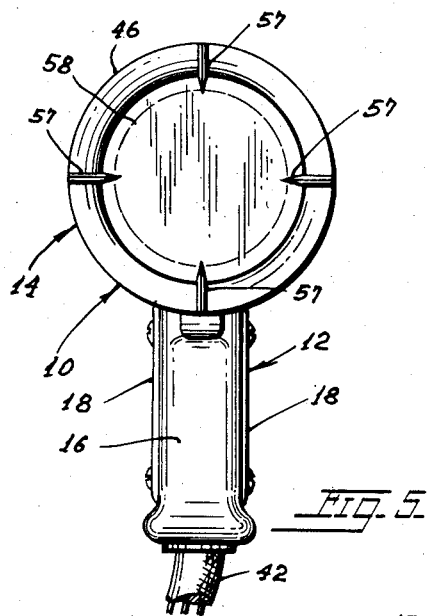
Fig. 5 is an end elevational view of the device as seen from the right of Fig. 1.
Figure 6:
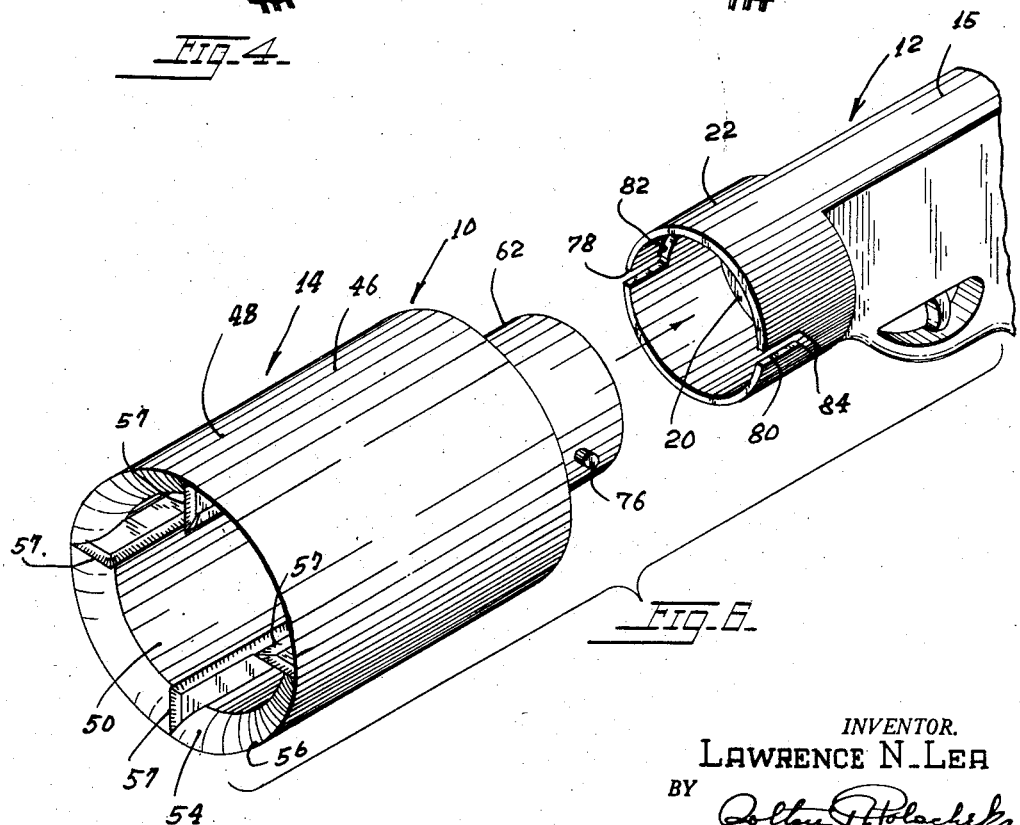
Fig. 6 is an enlarged, fragmentary, exploded perspective view.

Referring to the drawings in detail, the device constituting the present invention has been generally designated at 10 and may appropriately be considered as comprising two main components, these being a body portion 12 and a receiver 14 detachably connectible to the body portion.

The body portion is formed of electrically insulative material and is pistol shaped, and includes a hollow casing 15 having flat, parallel side walls, said side walls merging at their rear ends into the side walls of a pistol grip handle 16 to which may be attached knurled or otherwise roughened side plates 18 to provide a better grip upon the handle.

At their forward ends, the side walls are integral with a circular partition 20 disposed transversely of the body portion. Integral with and projecting forwardly from partition 20 is a sleeve 22 open at its front end.

The partition 20 thus becomes an inner end wall for sleeve 22 and embedded in the partition, in the forward face thereof, are concentric, spaced, electrically conductive contact outer and inner rings 24, 26 respectively. Connected to ring 24 is a lead 28 while a lead 30 is connected to the inner ring 26. Lead 30 is connected to one terminal of a trigger-operated switch 32, and it will be understood that switch 32 is per se conventional, and hence need not be described in detail herein. Switches of this type are well known in electric, pistol-shaped drills such as are used by the ordinary householder. Such a switch in some instances remains in an "on" position on a single squeezing of the trigger, and subsequently is operated to an "off" position responsive to a second squeezing of the trigger. It will be understood that various types of switches might be employed, and it is mainly important, for the purposes of the present application, to note that the switch will be operated to an "on" position responsive to pulling of the trigger toward the left in Fig. 1, and will automatically operate to "off" position when pressure on the trigger is released.

Connected to the other terminal of switch 32 is a lead 34, connected to one terminal of a rheostat 36 having a rotary knob readily accessible to the user. From the other terminal of the rheostat extends a lead 38 and this, together with the lead 28, is enclosed in an electrically insulative sheath 40 merging at the outer end of handle 16 into cord 42.

The electric cord 42 is of the three-wire type, so as to include a ground wire, and hence carries a three-prong electric plug 44 which would be plugged into a suitable grounded receptacle, not shown.

Considering now the construction of the receiver 14, this includes a tubular container portion 46. Container portion 46 is of double-walled construction, including an outer wall 48 and an inner wall 50, both of electrically insulative material. The material selected is one having, however, a high rate of heat exchange or thermal conductivity. Enclosed in the space between the walls 48, 50 is a resistance unit or electric heating element 52, and this is of coiled form, with the convolutions of the resistance unit extending in closely spaced relation through the whole length of the container portion 46. Accordingly, on energizing of the coil, heat will be directed both inwardly and outwardly of the container portion, through the walls 50, 48 respectively.

Wall 50, at its outer end, has a flared portion 54 extending into converging relation to the outer end of wall 48. This provides a beveled outer end edge 56 on container portion 46, facilitating its penetration of a frozen substance such as ice cream.

In the present instance, the container portion is of circular cross section, and is of constant diameter from end to end thereof. Accordingly, when the container portion is inserted fully to its inner end into the ice cream or other frozen substance, and is later withdrawn, it will remove a correspondingly cylindrically-shaped, individual portion of the ice cream. The container portion could be of any other cross-sectional shape, and might for example be of square cross section or perhaps of a conical or hemispherical shape. It will be seen that in this way one may dispense individual portions of the ice cream in corresponding shapes, thus providing attractive individual portions of the food.

Further, when the cross-sectional shape of the container portion is other than circular, the quantity of ice cream filling the same can be readily separated from the remaining ice cream in the carton or other large container merely by a slight axial twist of the entire device. Since the quantity of the food that is in the container portion will be of noncircular cross section and will be engaged by the complementarily shaped side wall of the container portion, the twisting action will separate the material to be dropped from the remaining material within the carton.

As will be noted, the inner side wall 50 merges into an end wall 58 spaced forwardly a short distance from an end wall 60 that is integral with the other side wall 48. Integral with and projecting axially from end wall 60 is a cylindrical, hollow extension 62 adapted to fit snugly within the forwardly opening sleeve 22. Extension 62 has an end wall 64 engageable against the partition 20 of the body portion of the device and embedded in the outer surface of end wall 64 are concentric, electrically conductive outer and inner rings 66, 68 respectively, that bear against the corresponding contact rings 24, 26 of the body portion 10.

Integrally formed on the side wall 50 are longitudinal cutting blades 57 angularly spaced about the inner circumference of the receiver to cause the ice cream to adhere to the receiver when the same is axially twisted, and break away from the ice cream remaining in the can or carton.

Connected to one end of the resistance element 52 is a lead 70 and connected to the other end of said resistance element is a lead 72. Leads 70, 72 are permanently connected to the rings 66, 68 respectively. Therefore, when the receiver 14 is engaged with the body portion 10 an electrical connection will automatically be provided, such that on closing of switch 32 current will be caused to flow through the resistance unit of coil 52.

Means is incorporated in the invention for separably interlocking the receiver and body portion. To this end, the receiver has diametrically opposite lugs 74, 76 formed upon extension 62 and projecting radially, outwardly from the side wall of the extension. Sleeve 22 has diametrically opposed slots 78, 80 extending longitudinally of the sleeve and opening upon the outer end thereof. At their inner ends, slots 78, 80 merge into lateral extension slots 82, 84, these being inclined slightly in respect to a plane normal to the axis of sleeve 22. At their outer ends, the inclined extension slots merge into slot portions 86, 88 which are extended in the mentioned plane.

By reason of this construction, when extension 62 of the receiver is inserted in the sleeve, the lugs 74, 76 will initially pass through the longitudinal slots 78, 80. Then the lugs, responsive to rotation of the receiver in respect to the body portion, will travel within the slot extensions 82, 84 which constitute cam slots arranged to bias the axial extension 62 of the receiver in an axial direction inwardly of sleeve 22. This brings the end wall 64 into firm engagement with partition 20. Ultimately, with the end wall and partition firmly engaged against each other, further rotational movement of the receiver will cause the lugs to engage in the locking portions 86, 88 of the slots.

The receiver is detached with equal facility, and this has the desirable characteristic of permitting the receiver to be removed whenever desired, so that a receiver of different size and/or shape can be substituted therefor.

In use of the device, a selected receiver is attached to the body portion. Then, the trigger is squeezed, causing the resistance coil to heat up instantly. The wall of the receiver is thus immediately heated, so that the receiver can be swiftly pressed into the frozen substance, melting it swiftly to allow full, rapid penetration of said substance by the receiver. This causes a quantity of the substance to fill the interior of the receiver.

When the substance has been fully penetrated, the switch is opened by release of the pressure on the trigger and the resistance unit instantaneously begins to cool. This causes the ice cream to adhere to the inner side wall of the receiver.

In this connection, the outer side wall of the receiver has a distinctly higher rate of heat exchange than the inner side wall thereof. As a result, when the resistance unit begins to cool, the outer side wall is at a higher temperature than the inner side wall so as to continue to have a melting effect upon the ice cream.

Therefore, the ice cream within the receiver will adhere to the wall thereof, but the ice cream surrounding the receiver will not so adhere. The device may be slightly rocked preliminary to withdrawal, to facilitate its extraction, and the rocking will further break off the receiver-confined quantity from the remaining material within the container or carton, not shown. If the receiver is of noncircular cross section, this action may be made even more effective by axially twisting the device.

When the device has been extracted from the carton, the switch is turned on again and the application of heat to the confined quantity of ice cream will cause the same to slide out of the receiver, onto a plate or other recepticle.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. An electrically heated dipper for a frozen food comprising an insulating body portion including a casing, a handle on the casing, and a sleeve, a receiver including an insulating hollow cylindrical body open at one end to receive said food, an insulating axial extension on the other end of the body removably engageable in said sleeve, and an electrical heating element in the wall of the body, means for interlockingly engaging the sleeve and extension, contact means on the sleeve and extension respectively engaging in the interlocked portions of the sleeve and extension, an electrical connection between the contact means of the extension and said heating element, and an electrical connection between the contact means of the sleeve and a source of electricity, the contact means of the sleeve and extension comprising concentric, electrically conductive rings, said means for interlocking the sleeve and extension shifting into locking and unlocking positions responsive to relative rotation of the sleeve and extension in respectively opposite directions, said interlocking means comprising diametrically opposed lugs on the extension, and locking slots formed in the sleeve, said slots including longitudinal entrance portions, circumferentially extending cam portions disposed obliquely to a plane normal to the axis of a sleeve and extension, and locking portions lying in said plane.

2. An electrically heated dipper for a frozen food comprising an insulating body portion including a casing, a handle on the casing, and a sleeve, a receiver including an insulating hollow cylindrical body open at one end to receive said food, an insulating axial extension on the other end of the body removably engageable in said sleeve, and an electrical heating element in the wall of the body, means for interlockingly engaging the sleeve and extension, contact means on the sleeve and extension respectively engaging in the interlocked portions of the sleeve and extension, an electrical connection between the contact means of the extension and said heating element, and an electrical connection between the contact means of the sleeve and a source of electricity, the receiver being of double-walled construction and including spaced inner and outer side walls, having a high rate of heat exchange, the heat exchange rate of the outer side wall being greater than that of the inner side wall, said walls extending into convergence at the open end of the receiver body to form a blade-like edge on said open end of the body, the receiver body including longitudinally extending blades formed upon the inner side wall thereof and projecting radially inwardly of the receiver body.

References Cited in the file of this patent

UNITED STATES PATENTS

| | | |
|---|---|---|
| 1,971,577 | Parker | Aug. 28, 1934 |
| 2,256,770 | Armstrong | Sept. 23, 1941 |
| 2,260,689 | Miller | Oct. 28, 1941 |
| 2,364,730 | Leskin | Dec. 12, 1944 |
| 2,615,405 | Goodnight | Oct. 28, 1952 |
| 2,715,175 | Jacobson | Aug. 9, 1955 |